(12) United States Patent
Chen

(10) Patent No.: US 7,734,790 B1
(45) Date of Patent: Jun. 8, 2010

(54) PROACTIVE DELIVERY OF MESSAGES BEHIND A NETWORK FIREWALL

(75) Inventor: Jimmy I-Ming Chen, Taipei (TW)

(73) Assignee: Trend Micro, Inc., Tokyo (JP)

( * ) Notice: Subject to any disclaimer, the term of this patent is extended or adjusted under 35 U.S.C. 154(b) by 1266 days.

(21) Appl. No.: 11/085,683

(22) Filed: Mar. 21, 2005

(51) Int. Cl.
*G06F 15/16* (2006.01)

(52) U.S. Cl. .................. 709/227; 709/203; 709/219; 709/222; 709/228

(58) Field of Classification Search ............... 709/203, 709/217–219, 222, 227, 228
See application file for complete search history.

(56) References Cited

U.S. PATENT DOCUMENTS

| | | | |
|---|---|---|---|
| 7,130,899 B1 * | 10/2006 | Bauer et al. ............ | 709/223 |
| 7,171,473 B1 * | 1/2007 | Eftis et al. ............. | 709/227 |
| 2002/0023143 A1 * | 2/2002 | Stephenson et al. ..... | 709/218 |
| 2005/0086295 A1 * | 4/2005 | Cunningham et al. .... | 709/203 |
| 2005/0108444 A1 * | 5/2005 | Flauaus et al. ......... | 710/15 |

* cited by examiner

*Primary Examiner*—Phuoc Nguyen
(74) *Attorney, Agent, or Firm*—Beyer Law Group LLP

(57) ABSTRACT

A subnetwork of client computers includes a designated relay host computer that communicates through a firewall with an outside server computer located within the same computing environment or over an Internet connection. A specially-designated URL on the server is used when the relay host requests that a downlink connection be kept alive indefinitely with the server computer. The server receives the HTTP request and activates a continuous heartbeat program. Heartbeat messages are sent continuously from the server computer to the relay host to keep the downlink connection open indefinitely. When the server needs to send an urgent message to the client computers it can do so immediately by using the already open downlink connection. The relay host forwards messages to the other component client computers in the subnetwork. The relay host may also use a proxy server. The downlink connection uses a standard request-reply protocol.

20 Claims, 3 Drawing Sheets

PROACTIVE DELIVERY OF MESSAGES BEHIND A NETWORK FIREWALL

FIELD OF THE INVENTION

The present invention relates generally to communication between client computers and server computers. More specifically, the present invention relates to communication through a network firewall.

BACKGROUND OF THE INVENTION

In a client/server computer network environment the client computers are typically separated from the server computer by a firewall that protects the client computers from any unauthorized tampering. The server computer might be part of the same corporate intranet as the client computers but located on a different network segment, or might be located anywhere in the world. Whether the network environment is part of a corporate intranet or is connected to the Internet, use of a firewall prevents unauthorized access to the client computers that might originate from within the intranet or from anywhere on the Internet. Such use of a hardware or software firewall is well known.

In such a typical client/server network environment a client makes a connection to the server, requests a service, the server replies to client and then the connection is closed. An example of this request-reply type protocol is the HTTP/HTTPS web protocol. Using such a protocol, a server would not be able to open a connection to a client computer behind firewall of its own accord. Unfortunately, in many situations it would be desirable to allow a server computer to proactively deliver a time-critical message to a client computer behind firewall without waiting for a client to establish a connection and make a request first.

For example, when a new computer virus outbreak occurs certain companies track such an outbreak and are in a good position to alert their clients to take protective action. It would be desirable to deliver an urgent message within minutes to any number of their client's client computers advising them to make a configuration change, even before the new virus update or virus pattern is available to more effectively counteract the new virus. Once the new virus pattern is available, it is also important to be able to deliver these patterns as quickly as possible to client computers. Other situations where it would be desirable to deliver an urgent message to client computers include immediate delivery of security policies and general command messages in order to immediately enforce such policies.

Prior art techniques do not adequately address these needs while at the same time preserving the integrity of the purpose of the firewall. In some situations each client computer behind the firewall maintains an active connection to the server computer outside the firewall at all times through polling. But, polling is very resource intensive technique and not very scalable. It is not uncommon to have hundreds of client computers behind a firewall; it is not practical to have each client continuously poll the server to see if there are any urgent messages. Even if polling were successful, if polling happens only every five minutes for each computer, then an urgent message might be delayed by as much as five minutes. Other techniques, such as custom protocols, rely upon opening "a hole" in the firewall to allow for an active connection from the server computer to a client computer, thus accommodating any urgent messages. For example, one company opens a dedicated DNS port in the firewall to allow such urgent communications. But, such an open port makes the firewall and the client computers behind it more vulnerable to exploitation from the outside.

Given the need to deliver such urgent messages to client computers behind a firewall, and the inadequacy of prior art techniques, a solution is desired.

SUMMARY OF THE INVENTION

To achieve the foregoing, and in accordance with the purpose of the present invention, a method is disclosed that allows a server computer to proactively deliver messages to a large number of client computers behind a firewall.

One of the client computers behind the firewall is designated as a relay host computer and the server computer outside the firewall keeps open a connection by continuously sending heartbeat messages to the relay host (or to any number of relay hosts). When the server needs to send an urgent message to each of the client computers, it sends the message to the relay host that then propagates the message to any of the specified client computers. Because only the dedicated relay host computer is continuously connected to the server computer, the server computer is limited in the activity it can perform behind the firewall, thus limiting security risks. For example, if the server computer outside of the firewall were to be compromised by an intruder, since only the dedicated relay host is connected to the server, the intruder can only compromise the relay host rather than all of the connected client computers.

By using this method, the server can proactively send time-critical messages to a large number of client computers behind the firewall without requiring that all of these clients continuously hold an active connection to the server, thus achieving scalability. Further, because polling is not used, these time-critical messages can be delivered immediately and not be delayed while waiting for the next poll to occur. For example, messages can be delivered on the order of a few seconds rather than waiting several minutes if a polling method is used.

The method may be implemented over standard web-based request-reply protocols (such as HTTP/HTTPS) and thus inherits many of the advantages of following these standard protocols, including the use of standard HTTP proxies. While a corporation might implement a costly custom protocol in order to allow a server to access a client computer behind firewall, such a protocol usually involves opening a hole in the firewall thus making the network more vulnerable. Understandably, most corporations preferred to rely upon standard request-reply protocols that provide more protection for computers behind the firewall. The present invention capitalizes on the usage of standard request-reply protocols by implementing a method that is compatible with any such request-reply protocol.

As mentioned, the present invention is also suitable for use with any standard HTTP proxy server such as the SQUID proxy server, the Microsoft Internet Acceleration server, the Netscape Web Proxy server, etc. When used with a proxy server, the relay host communicates with the outside world through the proxy server. Because the present invention can be based on any standard request-reply protocol, the present invention is compatible with features of those protocols such as use of a proxy server.

Thus, the present invention provides a method for a server to proactively deliver urgent messages to any number of client computers behind a firewall using minimal resources and using a standard request-reply type protocol.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE INVENTION

Figure 1:
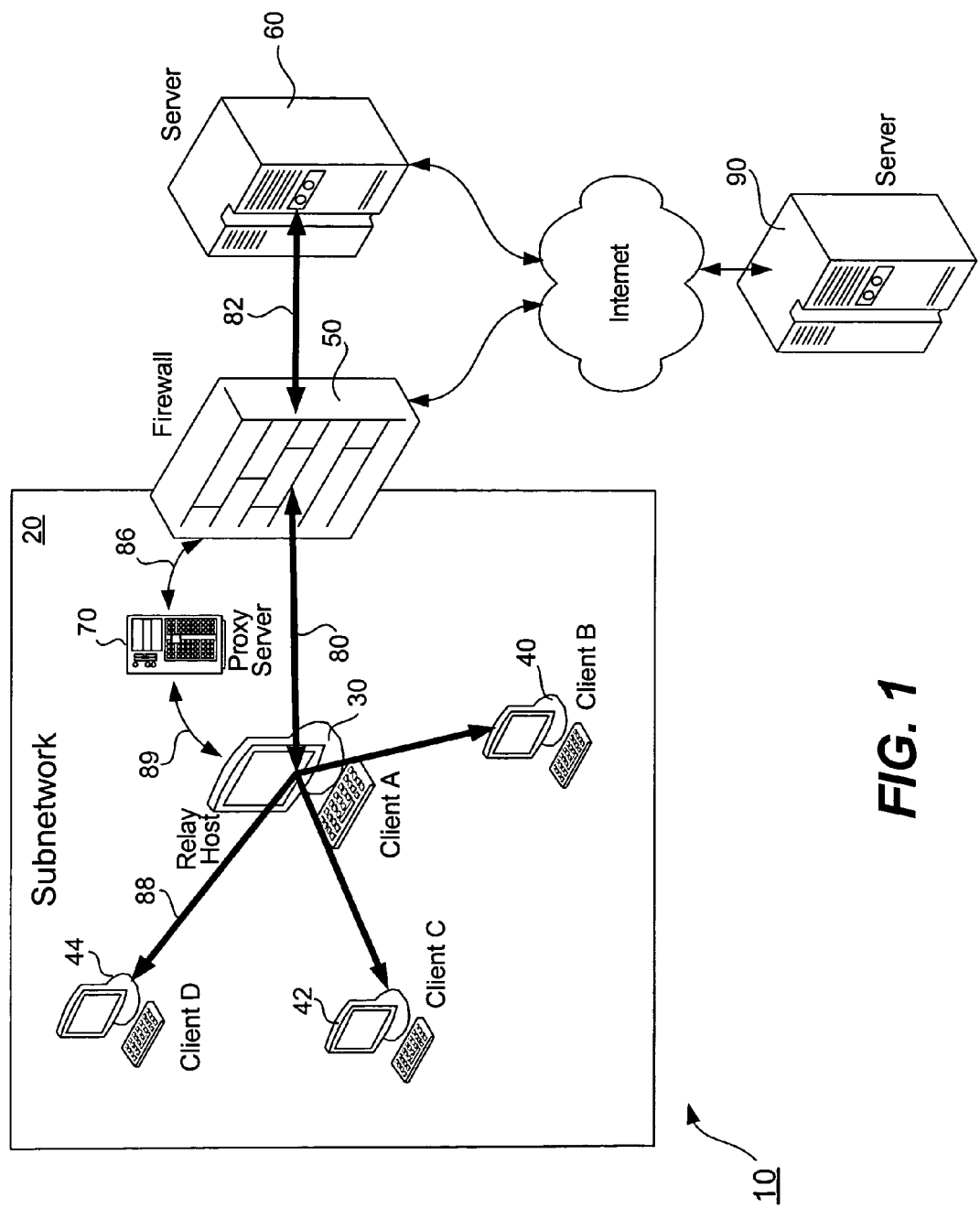
FIG. 1 is a block diagram illustrating a system for implementing an embodiment of the invention.

FIG. 1 is a block diagram illustrating a system 10 for implementing an embodiment of the invention. In this example, shown is a subnetwork 20 that is part of a corporate or other enterprise computing environment. Subnetwork 20 includes any number of client computers such as client 30 and clients 40-44. The client computers communicate through a firewall 50 to a server computer 60. In an alternative embodiment, the client computers use a proxy server 70 as an intermediary to handle all communications with outside server 60. Communication links 80, 82, 84 and 86 are implemented using any request-reply protocol such as the standard HTTP and HTTPS protocols. HTTP is the communication protocol typically used on all generally-accessible web sites by web browsers such as those from Microsoft and Netscape to make requests. Alternatively, any other standard protocol or custom-designed protocol is also suitable for use with the invention.

Client computers 30 and 40-44 may be any suitable client computers such as workstations or personal computers. Client computer 30 is also designated as the relay host computer in order to assist with implementing the present invention. The designation of a single client computer as the relay host computer may be accomplished by directly configuring a particular computer to always serve as the relay host, or the relay host computer can be elected from amongst all available client computers. A designation as the relay host computer may change if a computer goes down or if dictated by other needs. In a preferred embodiment, all client computers runs similar software for performing a particular task, and relay host computer 30 also runs additional software (as will be explained in greater detail below) to perform the functionality as a relay host computer. In general, the relay host maintains a continuous connection with server 60 outside the firewall and acts to relay urgent messages from that server to any specified client computer within subnetwork 20. In this fashion, a message sent to the relay host can be propagated to the other client computers.

Client computers 30 and 40-44 along with any optional proxy server 70 are all part of subnetwork 20 in that these machines may talk to one another directly without having to go through a firewall. In an alternative embodiment, subnetwork 20 is such that there are no firewalls, bridges or routers in between the client computers that would hinder communication. Client computers 30 and 40-44 also form a local area network that allows communication between computers using any suitable protocol. For example, communication link 88 between client 30 and client 44 may be implemented as an RPC, SOAP, or peer-to-peer protocol, or as any custom-designed TCP/IP protocol.

Proxy server 70 may be any of the well-known types of computer proxy servers used to handle communications between an outside server and any number of client computers. In this embodiment, proxy server 70 implements the HTTP request-reply protocol. The proxy server acts as an intermediary between a client computer and the Internet (or other outside server) so that the enterprise-computing environment can ensure security, administrative control and provide a caching service. A proxy server is typically associated with (or part of) a gateway server that separates the computing environment from the outside and a firewall server that protects the environment from tampering. As is well-known in the art, a proxy server might field a request for a web page from a client computer and use its own cache to return the page. Or, the proxy server will use one of its own IP addresses to request the page from the Internet. To the user or client computer, the proxy server is invisible; all Internet requests and return responses appear to be directly with an Internet server.

Firewall 50 may be any suitable firewall such as a passive device implemented in hardware or software that resides on a computer that controls access to the client computers behind the firewall. Firewalls are well known in the art. The functions performed by the proxy, firewall and any caching can be in separate server programs or may be combined in a single server program. If embodied within different server programs, the server programs can reside on the same computer, or each server program may reside in a separate server computer as shown.

In one embodiment, server 60 is also part of the same computing environment as the client computers, but is outside of firewall 50 for security reasons. Server 60 may be stand-alone, may be connected to other servers within the same computing environment or may be connected to the Internet at shown in order to allow communication with any other computers connected to the Internet. Messages that need to be urgently delivered to any of the client computers may originate within server 60 itself, from within another portion of the same computing environment, or from any other computer connected to the Internet, such as server 90. In another embodiment, the client computers within subnetwork 20 connect directly to the Internet and any connected computer (such as server computer 90) directly via firewall 50 instead of via server computer 60.

System Flow

In operation, client computer 30 is selected or elected as the relay host computer and makes itself known to outside server 60 by making an HTTP request to the server, requesting that this particular downlink connection request be held alive by having the server periodically send a heartbeat message in the downlink. When the server needs to send an urgent message to many clients (or to just one client) in the same subnetwork behind the firewall as relay host 30, it sends the message through the downlink that has been kept alive via the heartbeat messages. Relay host 30 can then act as a forwarding host for this message and can propagate the message to the desired client computers. From the point of view of the HTTP protocol, the downlink is kept open because it appears that server 60 never finished replying to the original HTTP request by relay host 30.

A heartbeat message is a signal emitted at regular intervals by software to demonstrate that it is still alive, working or ready. A heartbeat message is a software construct that helps to verify the continual operation of a specific component in a system. The component continually broadcasts a signal to a targeted environment, and one can assume that the component is working normally or ready when the targeted environment continuously detects the components of heartbeat signals. Although heartbeat messages are used to demonstrate that a specific software component is working or ready, it is believed that heartbeat messages have not been used in the past to keep open a downlink connection, and specifically have not been used in the context of a request-reply protocol.

Figure 2:
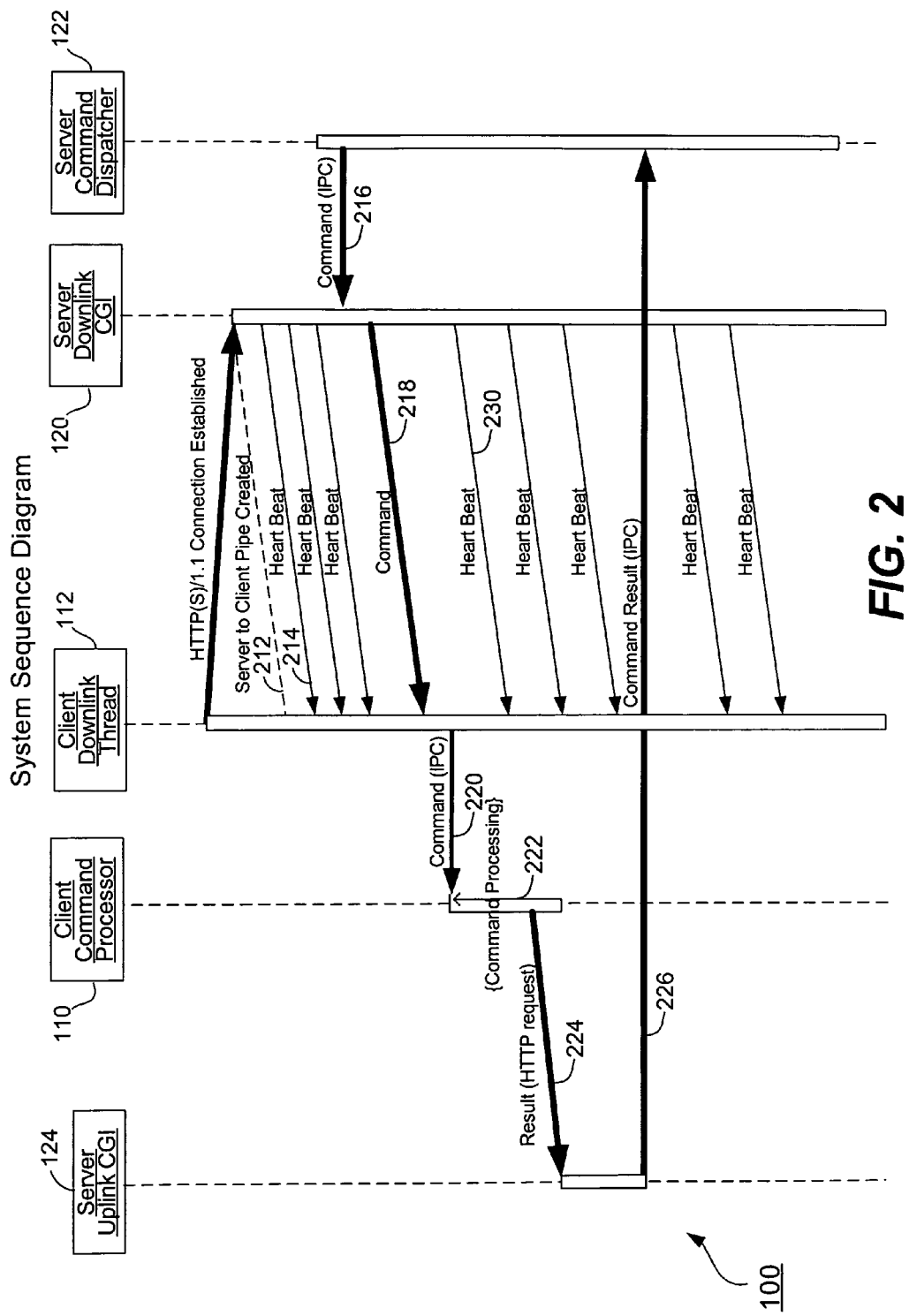
FIG. 2 illustrates a system sequence diagram showing a flow for one embodiment of the invention.

FIG. 2 illustrates a system sequence diagram 100 showing a flow for one embodiment of the invention. Diagram 100 is a UML sequence diagram that includes the entities involved in the flow listed at the top of each column, a dashed lifeline for each entity, an activation box for each entity indicating when the entity is performing an action, and messages represented as arrows showing communications between the entities. Representing relay host computer 30 are two threads or processes, 110 and 112. Client command processor thread 110 is a thread for the relay host executing overall command; client downlink thread 112 is a thread used to open a connection with the server and to receive the heartbeat messages. Threads 110 and 112 may be in the same process on the relay host or may be in different processes.

Representing server 60 are threads 120, 122 and 124. Server downlink thread 120 is a CGI program that fields requests from a client to open the downlink; server command dispatcher 122 is a process on the server arranged to dispatch urgent messages or commands to any of the client computers; and server uplink thread 124 is a CGI program that responds to an HTTP request that contains the processing result of the command as delivered to the client by thread 120. In this example, this second HTTP request is sent to the server uplink CGI instead of being handled by the original server downlink; the second server thread 124 is used to process this command process result because thread 120 is otherwise kept busy by the heartbeat message connection that does not terminate.

As is known in the art, the Common Gateway Interface (CGI) is a standard for interfacing external applications with information servers, such as HTTP or web servers. A CGI program is executable in real time and can output dynamic information. A CGI program may be written in any suitable language allowing it to be executed on the server such as C, C++, PERL, any UNIX shell, Visual Basic or AppleScript.

To implement the present invention, a specially designated URL on the server is used when a relay host is requesting that a downlink connection be kept alive via heartbeat, messages. When server 60 receives an HTTP request via the special URL it knows that the requesting relay host would like the connection kept open. Accordingly, the server then activates a special continuous heartbeat program to keep the connection alive. This heartbeat program may be embodied within the server downlink CGI program 120 or may be a separate program that is accessed via program 120.

In step 210 the relay host makes a request of the server to open an HTTP downlink connection. Preferably, this request is made using the special URL of the server. Alternatively, the request 210 may include a flag, identifier or other indication to the server that the relay host would like the connection kept open indefinitely. In other embodiments, the relay host uses other techniques to indicate to the server that it would like the connection kept open indefinitely. By way of example, the relay host can also format the request in a special way so as to indicate to the server that it wants to keep the connection open. For example, in its request message, it may contain a line that says "KEEP-HEARTBEAT-CONNECTION." When the server sees this line in the request, it will know to keep the connection open with heartbeat messages.

In step 212 the server responds with a message confirming that the downlink connection is open. Once open, the CGI program 120 begins sending periodic heartbeat messages 214 over the downlink to the relay host. The heartbeat message may take any form. Preferably, the heartbeat message is a single character or brief text in order to conserve resources. For example, the heartbeat message may be as simple as a single period, ".", the advantage being that such a character only takes up one byte. The heartbeat message may be sent every 5 to 10 seconds, or as the situation requires. By sending out these periodic heartbeat messages the server is able to keep the downlink connection to the relay host open. Such a technique has the advantage over polling because polling would require a request to be sent, processing to occur, and a reply to be sent, thus consuming much greater bandwidth.

At some point in time, server command dispatcher 122 determines that an urgent message should be sent from server 60 to any of the client computers behind the firewall via relay host 30. This determination may originate from an internal process of server 60, from an outside process within the enterprise environment, or from server 90 (for example) connected to server 60 over the Internet. The message is sent via a command 216 from dispatcher 122 to the server downlink program 120. Command 216 may be sent between processes on the same computer using any standard inter-process communications. Once downlink program 120 receives the command it temporarily ceases the sending of heartbeat messages, and instead sends the command message out over the downlink connection to client downlink thread 112. Once the command has been sent over the downlink connection, the heartbeat messages resume at 230 in order to keep the downlink connection open for any further urgent messages.

It should be appreciated that the heartbeat program can be arranged to send the heartbeat messages and keep the downlink connection open to the relay host indefinitely. In this fashion, the server can send an urgent message at any time.

Client downlink thread 112 then forwards the command message 220 to the client command processor thread 110 for appropriate processing. At step 222 the relay host takes the appropriate action depending upon the content of the urgent message. The relay host might process the message itself and take action, or might be directed to deploy the content of the message to each of the client computers located on its subnetwork. Alternatively, the message might direct the relay host to only forward the message to certain of the client computers. The content of the urgent message may take any of the wide variety of forms. For example, when a new computer virus outbreak is detected, the present invention allows a company to immediately send an urgent message to various client computers advising them to propagate a configuration change in order to help prevents a virus outbreak. Such a configuration change may include blocking a particular port, preventing certain files from being opened, stopping a particular service, only accepting connections from specified client IP addresses, rate limit connections, traffic shaping policies, etc.

Once the command has been processed accordingly, the command processor 110 sends a result message 224 back to the server via a server uplink CGI program 124. This message 224 is a separate HTTP request to the server and indicates to the server the status of its previous urgent command, i.e., whether the command was successful or not. In other embodiments, the result does not need to be sent back via a separate HTTP request but could be sent back via the original request. But, it is realized that if result is to be sent via the original request, there are various technical and compatibility issues that could cause problems under many commonly encountered implementation or configuration environments. Therefore, sending results via a second request helps to guarantee applicability and compatibility in most all circumstances.

The server uplink CGI program 124 then forwards the results command via inter-process communications 226 back to the server command dispatcher 122 for any final processing or reporting. At this point the server 60 has received verification that the relay host has acted upon its urgent message.

Computer System Embodiment

Figure 3A:
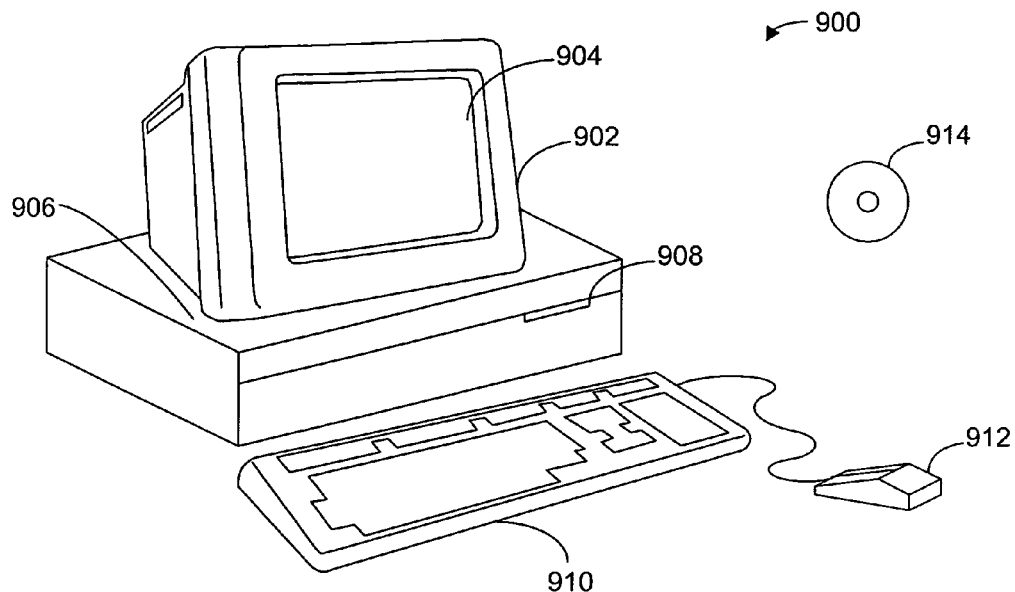
FIGS. 3A and 3B illustrate a computer system 900 suitable for implementing embodiments of the present invention.
Figure 3B:
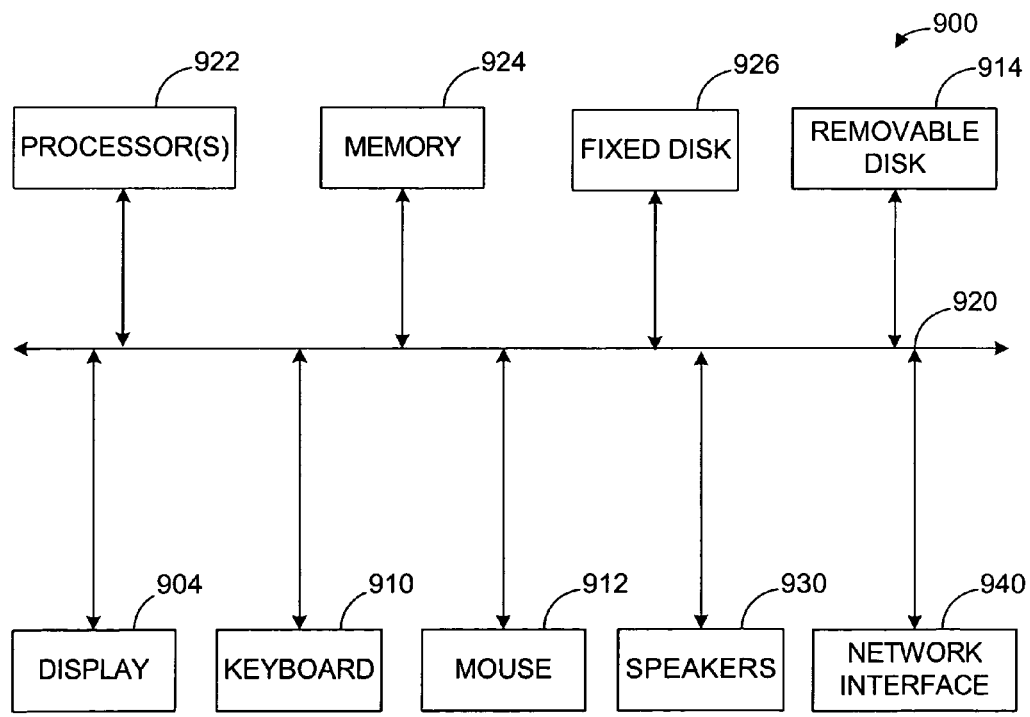

FIGS. 3A and 3B illustrate a computer system 900 suitable for implementing embodiments of the present invention. FIG. 3A shows one possible physical form of the computer system. Of course, the computer system may have many physical forms ranging from an integrated circuit, a printed circuit board and a small handheld device up to a huge super computer. Computer system 900 includes a monitor 902, a display 904, a housing 906, a disk drive 908, a keyboard 910 and a mouse 912. Disk 914 is a computer-readable medium used to transfer data to and from computer system 900.

FIG. 3B is an example of a block diagram for computer system 900. Attached to system bus 920 are a wide variety of subsystems. Processor(s) 922 (also referred to as central processing units, or CPUs) are coupled to storage devices including memory 924. Memory 924 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable of the computer-readable media described below. A fixed disk 926 is also coupled bi-directionally to CPU 922; it provides additional data storage capacity and may also include any of the computer-readable media described below. Fixed disk 926 may be used to store programs, data and the like and is typically a secondary storage medium (such as a hard disk) that is slower than primary storage. It will be appreciated that the information retained within fixed disk 926, may, in appropriate cases, be incorporated in standard fashion as virtual memory in memory 924. Removable disk 914 may take the form of any of the computer-readable media described below.

CPU 922 is also coupled to a variety of input/output devices such as display 904, keyboard 910, mouse 912 and speakers 930. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 922 optionally may be coupled to another computer or telecommunications network using network interface 940. With such a network interface, it is contemplated that the CPU might receive information from the network, or might output information to the network in the course of performing the above-described method steps. Furthermore, method embodiments of the present invention may execute solely upon CPU 922 or may execute over a network such as the Internet in conjunction with a remote CPU that shares a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher level code that are executed by a computer using an interpreter.

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

I claim:

1. A method of keeping a downlink connection from a server computer to a client computer open, said method comprising:

designating said client computer as a relay host computer of a subnetwork of a plurality of client computers located behind a firewall device;

delegating the responsibility of maintaining an open connection with said server computer on behalf of said client computers to said relay host computer, wherein said relay host computer is arranged to forward messages from said server computer to said client computers;

receiving a request at said server computer from said client computer to establish a downlink connection through said firewall device;

receiving an indication from said client computer to keep said downlink connection open indefinitely;

sending periodic heartbeat messages from said server computer to said client computer through said firewall; and keeping said downlink connection from said server computer to said client computer open indefinitely by virtue of said periodic heartbeat messages, wherein said client computer is not required to send a message to said server computer to keep said downlink connection open, and wherein said downlink connection is kept open solely through use of said periodic heartbeat messages.

2. A method as recited in claim 1 wherein said server computer and said client computer communicate through said firewall using a request-reply protocol, wherein said periodic heartbeat messages from said server computer do not constitute a reply in said protocol, whereby said downlink connection is kept open.

3. A method as recited in claim 2 wherein said request-reply protocol is HTTP.

4. A method as recited in claim 1 further comprising:

determining an urgent message to send to said client computer from said server computer through said firewall; and sending said urgent message to said client computer over said open downlink connection, whereby said urgent message arrives at said client computer immediately after said step of determining.

5. A method as recited in claim 4 wherein said urgent message arrives within minutes after said step of determining.

6. A method as recited in claim 4 wherein said urgent message arrives within seconds after said step of determining.

7. A method as recited in claim 1 wherein said server computer is located within the same computing environment as said client computer or said server computer is located remotely from said client computer over an Internet connection.

8. A method of keeping a downlink connection from a server computer to a client computer open, said method comprising:

designating said client computer as a relay host computer of a subnetwork of a plurality of client computers located behind a firewall device;

delegating the responsibility of maintaining an open connection with said server computer on behalf of said client computers to said relay host computer, wherein said relay host computer is arranged to forward messages from said server computer to said client computers;

sending a request to said server computer from said client computer to establish a downlink connection through said firewall device;

sending an indication from said client computer to keep said downlink connection open indefinitely;

receiving at said client computer periodic heartbeat messages from said server computer through said firewall; and keeping said downlink connection from said server computer to said client computer open indefinitely by virtue of said periodic heartbeat messages, wherein said client computer is not required to send a message to said server computer to keep said downlink connection open, and wherein said downlink connection is kept open solely through use of said periodic heartbeat messages.

9. A method as recited in claim 8 wherein said server computer and said client computer communicate through said firewall using a request-reply protocol, wherein said periodic heartbeat messages from said server computer do not constitute a reply in said protocol, whereby said downlink connection is kept open.

10. A method as recited in claim 9 wherein said request-reply protocol is HTTP.

11. A method as recited in claim 8 further comprising:

receiving an urgent message from said server computer at said client computer over said open downlink connection; and forwarding said urgent message to another client computer located within the same subnetwork as said client computer.

12. A method as recited in claim 11 whereby said urgent message is received without said client computer having to request it.

13. A method as recited in claim 8 wherein said server computer is located within the same computing environment as said client computer or said server computer is located remotely from said client computer over an Internet connection.

14. A system for keeping a downlink connection open, said system comprising:

a subnetwork of a plurality of client computers;

a firewall device that monitors access to said subnetwork of client computers;

a single one of said client computers being designated as a relay host computer;

a server computer located outside of said firewall device;

an open downlink connection established between said relay host computer and said server computer, wherein the responsibility of maintaining said open downlink connection with said server computer on behalf of said client computers is delegated to said relay host computer, wherein said relay host computer is arranged to forward messages from said server computer to said client computers; and periodic heartbeat messages being sent from said server computer through said firewall to said relay host computer, said heartbeat messages being arranged to keep open indefinitely said downlink connection, wherein said relay host computer is not required to send a message to said server computer to keep said downlink connection open, and wherein said downlink connection is kept open solely through use of said periodic heartbeat messages.

15. A system as recited in claim 14 wherein said server computer and said relay host computer communicate through said firewall using a request-reply protocol, wherein said periodic heartbeat messages from said server computer do not constitute a reply in said protocol, whereby said downlink connection is kept open.

16. A method as recited in claim 15 wherein said request-reply protocol is HTTP.

17. A system as recited in claim 14 wherein said server computer is arranged to determine the need to send an urgent message and to send said urgent message to said relay host computer over said open downlink connection, whereby said urgent message arrives at said relay host computer immediately after determining said need.

18. A system as recited in claim 17 wherein said urgent message arrives within minutes after determining said need.

19. A system as recited in claim 17 wherein said urgent message arrives within seconds after determining said need.

20. A method as recited in claim 14 wherein said server computer is located within the same computing environment as said subnetwork of client computers or said server computer is located remotely from said subnetwork over an Internet connection.

\* \* \* \* \*